L. SCHOMBURG.
PIPE JOINT PACKING.
APPLICATION FILED OCT. 24, 1912.
1,102,961.
Patented July 7, 1914.
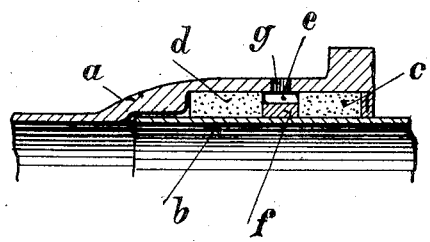
WITNESSES
L. H. Grote
M. E. Keir
INVENTOR
Ludwig Schomburg
by Johnson and Johnson
Attorneys

UNITED STATES PATENT OFFICE.

LUDWIG SCHOMBURG, OF GELSENKIRCHEN, GERMANY, ASSIGNOR TO THE FIRM OF MANNESMANNRÖHREN-WERKE, OF DUSSELDORF, GERMANY.

PIPE-JOINT PACKING.

1,102,961.   Specification of Letters Patent.   Patented July 7, 1914.

Application filed October 24, 1912. Serial No. 727,614.

*To all whom it may concern:*

Be it known that I, LUDWIG SCHOMBURG, a subject of the Emperor of Germany, and residing at Gelsenkirchen, Germany, have invented a certain new and useful Improvement in Pipe-Joint Packing, of which the following is a specification.

In order to render it possible to test the packing of a pipe joint a testing chamber may be formed outside the main packing by means of a secondary packing spaced therefrom, to which chamber the testing appliance (pump, manometer, etc.) is connected. Such tests with a gas under pressure have been made. Instead of gas or air I propose to employ a pressure fluid.

In the accompanying drawing, I have shown in vertical section so much of a pipe joint as is necessary to illustrate the invention.

The joint here shown is of the bell and spigot type, in which the spigot end $b$ of one pipe length enters the bell end $a$ of the adjacent length. An inner packing $d$ and an outer packing $c$ between these ends are spaced apart by the spacing ring $f$, thus forming the testing chamber $e$. An aperture $g$ is opened through the wall of the bell end to the chamber $g$ to permit the entrance of the testing means.

The use of a fluid as the testing medium is attended with many advantages. Packings which are made of tar waste or like material become dry after a more or less short time and no longer hold tight. If oil, glycerin or the like is introduced under pressure into the chamber $e$, between the packing rings $c$ and $d$, the latter are rendered moist and fully serve their function. If the first test of the packings is made with a fluid medium of the character mentioned, they become impregnated with the fluid and remain in good condition for a long while. It is possible of course to leave the test fluid in the chamber $e$ so that it constantly maintains the packings moist, and be placed under pressure again on the occasion of the succeeding test of the packings. It will be readily recognized furthermore that in addition to maintaining the packings $c$ and $d$ moist and in good condition for their purpose, the oil, glycerin or other fluid itself serves as an additional packing for the joint.

Should it be desired to remove the fluid from chamber $e$, this is readily accomplished at any time, by introducing a pump or exhaust tube, and the packings may then be tested by a gas under pressure.

I claim as my invention:—

1. A pipe joint having an outer and an inner absorbent packing, spaced apart in combination with a fluid between said packings, said fluid being of a character not only to maintain said packings moist and in good condition, but also to serve as a fluid packing, substantially as described.

2. A pipe joint having an outer and an inner absorbent packing spaced apart in combination with a fluid under pressure between said packings, said fluid being of a character not only to maintain said packings moist and in good condition, but also to serve as a fluid packing, substantially as described.

3. A pipe joint comprising a bell end and a spigot end inserted therein, an inner and an outer absorbent packing arranged between said pipe ends and spaced longitudinally apart to form a testing chamber, in combination with a body of fluid between said packings, said fluid being of a character not only to maintain said packings moist and in good condition but also to serve as a fluid packing, substantially as described.

4. A pipe joint of the bell and spigot type, an inner and an outer absorbent packing arranged between said pipe ends and spaced longitudinally apart to form a testing chamber, said bell end being apertured in register with said chamber to admit a testing appliance, in combination with a body of fluid between said packings, said fluid being of a character not only to maintain said packings moist and in good condition but also to serve as a fluid packing, substantially as described.

5. A pipe joint having an inner and outer absorbent packing spaced apart to form a testing chamber, a port opening to this chamber for the reception of a testing appliance, in combination with a body of fluid between said packings, said fluid being of a character not only to maintain said packings moist and in good condition but also to serve as a fluid packing, substantially as described.

In testimony whereof I have signed my name to this specification, in the presence of two subscribing witnesses.

LUDWIG SCHOMBURG.

Witnesses:
 WOLDEMAR HAUPT,
 RICHARD GOEBZ.